United States Patent
Han et al.

(10) Patent No.: US 11,096,513 B2
(45) Date of Patent: Aug. 24, 2021

(54) DRIVE ASSEMBLY AND FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Han Han, Foshan (CN); Weijie Chen, Foshan (CN); Yan Tang, Foshan (CN)

( * ) Notice: Subject to any disclaimer, the term of this patent is extended or adjusted under 35 U.S.C. 154(b) by 321 days.

(21) Appl. No.: 16/232,012

(22) Filed: Dec. 25, 2018

(65) Prior Publication Data
US 2019/0125119 A1 May 2, 2019

Related U.S. Application Data

(63) Continuation of application No. PCT/CN2017/074749, filed on Feb. 24, 2017.

(30) Foreign Application Priority Data

Jul. 6, 2016 (CN) .......................... 201610533190.2
Jul. 6, 2016 (CN) .......................... 201620715105.X

(51) Int. Cl.
*A47J 19/00* (2006.01)
*A47J 19/04* (2006.01)
(Continued)

(52) U.S. Cl.
CPC ........... *A47J 19/025* (2013.01); *A47J 43/087* (2013.01)

(58) Field of Classification Search
CPC .... A47J 19/00–027; A47J 19/04; A47J 19/06; A47J 43/08–087
See application file for complete search history.

(56) References Cited

U.S. PATENT DOCUMENTS 2,348,341 A * 5/1944 Gough .................. A47J 43/082
  310/66
4,106,401 A * 8/1978 Ackeret ................ A47J 19/023
  99/508
(Continued)

FOREIGN PATENT DOCUMENTS

CN 2730284 Y 10/2005
CN 102039689 A 5/2011
(Continued)

OTHER PUBLICATIONS

The second Office Action of CN Application No. 201610533190.2.
(Continued)

*Primary Examiner* — Michael A Laflame, Jr.
(74) *Attorney, Agent, or Firm* — Kilpatrick Townsend & Stockton, LLP

(57) ABSTRACT

The present disclosure provides a drive assembly and a food processor. The drive assembly comprises: a drive body; and a transmission assembly comprising at least a first transmission member and a second transmission member, the first transmission member being in driving connection with the drive body and provided thereon with a first drive shaft, and the second transmission member being in driving connection with the drive body and provided thereon with a second drive shaft. The technical solution is capable of driving, using a single drive body, at least two drive shafts to move, so that multi-shaft output with a single drive body can be realized.

11 Claims, 4 Drawing Sheets

(51) Int. Cl.
*A47J 19/06* (2006.01)
*A47J 43/08* (2006.01)
*A47J 19/02* (2006.01)

(56) References Cited

U.S. PATENT DOCUMENTS

| | | | | |
|---|---|---|---|---|
| 4,803,390 | A | * | 2/1989 | Bertram ................ A47J 43/08 310/112 |
| 5,592,873 | A | | 1/1997 | Lee |
| 2014/0096690 | A1 | * | 4/2014 | Kim ........................ A23N 1/02 99/513 |

FOREIGN PATENT DOCUMENTS

| | | |
|---|---|---|
| CN | 203576343 U | 5/2014 |
| CN | 203743314 U | 7/2014 |
| CN | 104542788 A | 4/2015 |
| CN | 105054228 A | 11/2015 |
| CN | 205267790 U | 6/2016 |
| CN | 205994228 U | 3/2017 |
| CN | 205994231 U | 3/2017 |
| CN | 205994232 U | 3/2017 |
| CN | 206062848 U | 4/2017 |
| CN | 206062849 U | 4/2017 |
| EP | 2777446 A1 | 9/2014 |
| JP | 1996065954 A | 3/1996 |
| JP | 1998108426 A | 4/1998 |
| JP | 2008055565 A | 3/2008 |
| KR | 101485401 B1 | 1/2015 |
| KR | 101548910 B1 | 9/2015 |

OTHER PUBLICATIONS

The first Office Action of JP 2018-567953.
The first Office Action dated Jun. 4, 2019 in the corresponding CN application No. 201610533190.2.
First search report of 201610533190.2 dated May 28, 2019 by CNIPA (China National Intellectual Property Administration).
European Search Report dated May 7, 2019 in the corresponding EP application (application No. 17823420.9).
International Search Report dated May 11, 2017 in the corresponding PCT application (application No. PCT/CN2017/074749).

* cited by examiner

DRIVE ASSEMBLY AND FOOD PROCESSOR

CROSS-REFERENCES TO RELATED APPLICATIONS

This application is continuation of international application PCT/CN2017/074749, filed on Feb. 24, 2017, which claims the priority to Chinese patent application No. 201610533190.2, filed with the Chinese Patent Office on Jul. 6, 2016, and entitled "Drive Assembly and Food Processor", and Chinese patent application No. 201620715105.X, filed with the Chinese Patent Office on Jul. 6, 2016, and entitled "Drive Assembly and Food Processor", all of which are incorporated herein by reference in their entirety.

TECHNICAL FIELD

The present disclosure relates to the field of kitchenware, in particular to a drive assembly and a food processor.

BACKGROUND OF THE INVENTION

The motor assemblies used in the existing juice machines on the market all use single-shaft output, and the single shaft drives a spiral head to complete pulverizing, squeezing, residue discharging, etc. However, when a spiral head of such configuration pulverizes fruits, due to the large squeezing force applied to the filter screen and the small meshes of the filter screen, lots of fruit residues are left on the meshes of the filter screen, which makes it not easy for the user to clean the filter screen.

Therefore, how to provide a drive assembly enabling multi-shaft output so that smashing, and squeezing and residue discharging of fruits can be achieved separately becomes an urgent problem to be solved at present.

BRIEF SUMMARY OF THE INVENTION

The present disclosure aims to solve at least one of the technical problems existing in the prior art or relevant technologies.

Therefore, one embodiment of the present disclosure is to provide a drive assembly.

The other embodiment of the present disclosure is to provide a food processor.

In view of the above, an embodiment of the present disclosure provides a drive assembly, comprising: a drive body; and a transmission assembly comprising at least a first transmission member and a second transmission member, the first transmission member being in driving connection with the drive body and provided thereon with a first drive shaft, and the second transmission member being in driving connection with the drive body and provided thereon with a second drive shaft.

The drive assembly according to the embodiment of the present disclosure is capable of driving, using a single drive body, at least two drive shafts to move, so that multi-shaft output with a single drive body can be realized. Therefore, when the drive assembly is used for a food processor, the first drive shaft can be used to drive a smashing device to smash food, and then the second drive shaft can be used to drive a squeezing device to squeeze the food, so as to separate the juice from the residues of the food, so that the smashing process of the food can be separated from the squeezing and residue discharging process, and at the same time, since squeezing and residue discharging are not required during the smashing process of the food, there is no need to arrange the structures such as a filter screen, and therefore the use of a filter screen and the like can be avoided, which thereby can reduce the number of parts of the food processor, so as to simplify the structure of the food processor and reduce the manufacturing and processing costs of the food processor.

In the above technical solution, the drive assembly further comprises: a power supply module that is connected with the drive body and is used for supplying power to the drive body.

In one embodiment, a power supply module can be provided, so that the power supply module can be connected with the mains supply, so as to supply power to the drive assembly using the mains supply.

In addition, the drive assembly in the above embodiment of the present disclosure can further have the following additional technical features:

In the above technical solution, the drive body is a motor comprising a motor shaft, the first transmission member is in driving connection with the motor shaft, and the second transmission member is in driving connection with the first transmission member.

In one embodiment, the drive body is a motor, thus, it is possible to use the motor to drive the transmission assembly to move, and such driving mode of motor is simple in structure and easy to realize.

In one embodiment, the first drive shaft and the second drive shaft are arranged to form a preset angle $\beta$, wherein the value of the preset angle $\beta$ is more than or equal to 60° and less than or equal to 135°.

In one embodiment, the drive assembly can achieve multi-shaft and multi-angle output by means of the first drive shaft and the second drive shaft, so that the single output direction of the drive assembly can be changed into multiple output directions, and therefore the driving of drive devices in multiple directions can be achieved at the same time using the drive assembly. In one embodiment, multi-shaft and multi-angle output of the drive assembly can be achieved by reasonably selecting the structure of the first transmission member and the second transmission member, or reasonably arranging the position of the first transmission member and the second transmission member. Further, the preset angle $\beta$ is greater than or equal to 75° and smaller than or equal to 120°, and in one embodiment, for example, $\beta$ is equal to 90°.

In one embodiment, the rotational speed ratio between the first drive shaft and the second drive shaft is A, the value of which is more than or equal to ⅔ and less than or equal to 3.

In one embodiment, the rotational speed ratio between the first drive shaft and the second drive shaft can be reasonably controlled by reasonably selecting the parameters of the first transmission member and the second transmission member, so that the rotational speed ratio between the first drive shaft and the second drive shaft can be adapted to specific application occasions.

In one embodiment, the rotational speed ratio is 1.

In one embodiment, the first drive shaft and the second drive shaft rotate in the same direction or in opposite directions.

In one embodiment, the first drive shaft and the second drive shaft can rotate in the same direction, for example, both rotate clockwise or both rotate anticlockwise; and of course, the first drive shaft and the second drive shaft can also rotate oppositely, in one embodiment, for example, one rotates clockwise and the other rotates anticlockwise.

In one embodiment, the first transmission member and the second transmission member are bevel gears that are meshed with each other; or the first transmission member is a turbine, and the second transmission member is a worm; or the first transmission member and the second transmission member are two helical gears whose shafts are arranged in a staggered manner.

In one embodiment, when the output direction of the motor is changed into multi-shaft and multi-angle output by means of the transmission assembly, a plurality of transmission modes can be used for the first transmission member and the second transmission member, in one embodiment, for example, the transmission mode of bevel gear and bevel gear, the transmission mode of turbine and worm, or the transmission mode of helical gears with staggered shafts, etc.

In one embodiment, the transmission assembly further comprises: a housing comprising an upper housing and a lower housing that are assembled, the upper housing and the lower housing defining an installation cavity, the first transmission member and the second transmission member being positioned in the installation cavity, and the first drive shaft and the second drive shaft extending out of the housing.

In one embodiment, the first transmission member and the second transmission member, and the first drive shaft and the second drive shaft can be installed in the housing, so that when in specific use, the transmission assembly can be moved and replaced as a whole.

In one embodiment, the transmission assembly further comprises a deceleration assembly arranged between the first transmission member and the motor shaft for reducing the rotational speed of the motor shaft to a desired rotational speed of the first drive shaft and the second drive shaft.

In another technical solution, the drive body is an electrified coil, the first transmission member and the second transmission member are both magnetically conducting disc bodies that rotate under a magnetic field generated by the electrified coil.

In one embodiment, the multi-shaft and multi-angle output can be realized by using the principle of solenoid drive. In one embodiment, for example, a magnetic field can be generated by using the electrified coil, and then the magnetically conducting disc bodies are driven to rotate by using the interaction between the magnetic property of the magnetically conducting disc bodies and the magnetic field of the electrified coil, so that the rotation of the magnetically conducting disc bodies can drive the first drive shaft and the second drive shaft to rotate, thereby achieving the multi-shaft and multi-angle output of the drive assembly.

In one embodiment, the magnetically conducting disc body comprises a disc body and a plurality of magnetically conducting bodies distributed in the circumferential direction of the disc body, wherein the magnetically conducting body is preferably a magnet.

An embodiment of the present disclosure provides a food processor comprising a drive assembly in any of the above technical solutions.

The food processor according to the embodiment of the present disclosure comprises a drive assembly provided in any of the embodiments of the present disclosure, and therefore the food processor has all the beneficial effects of the drive assembly provided in any of the above embodiments.

In one embodiment, the food processor further comprises: a host assembly comprising a drive assembly; a barrel body assembly installed on the host assembly and comprising a feed inlet; a first barrel body communicating with the feeding inlet; and a second barrel body communicating with the first barrel body through a communication port; a smashing device that is arranged in the first barrel body, is in driving connection with the first drive shaft of the drive assembly and is rotated under the driving of the first drive shaft; and a squeezing device that is arranged in the second barrel body, is in driving connection with the second drive shaft of the drive assembly and is rotated under the driving of the second drive shaft, wherein when rotating, the smashing device is capable of cooperating with an inner side wall of the first barrel body to smash food entering the first barrel body from the feed inlet, and the smashed food enters, under the effect of the smashing device, the second barrel body through the communication port and is squeezed by the squeezing device in the second barrel body to achieve separation between juice and food residues.

In one embodiment, food enters the first barrel body from the feed inlet and is then smashed by the smashing device matched with the side wall of the first barrel body, and the smashed food enters, under the effect of the smashing device, the second barrel body from the communication port, and is then squeezed by the squeezing device to achieve separation between juice and food residues. In one embodiment, the smashing process of the food is separated from the squeezing and residue discharging process, in the smashing process, since squeezing and residue discharging are not required, there is no need to arrange the components such as a filter screen and a rotary brush in the first barrel body, so that the food in the first barrel body can be smashed under the combined effect of the first barrel body and the smashing device, and in the squeezing and residue discharging process, the squeezing device can be substantially horizontally arranged, i.e., the squeezing and residue discharging system can be arranged to be horizontal, which thereby makes it very convenient to separate juice from food residues. Such configuration can, on the one hand, ensure the juice yield of the food processor, and on the other hand, avoid the use of the parts such as a filter screen and a rotary brush, which thereby makes the food processor simple in structure and easy to install; furthermore, since the filter screen is omitted, it is possible to reduce the cleaning difficulty for the user, which thereby improves the user experience. In one embodiment, it is feasible to drive the smashing device by means of the first drive shaft of the drive assembly to smash the food, and drive the squeezing device by means of the second drive shaft of the drive assembly to squeeze the food so as to achieve separation between juice and food residues.

In one embodiment, the feed inlet is located at an upper end of the first barrel body, the communication port is located at a lower end of the first barrel body, the second barrel body is installed on a side wall of the first barrel body, and the first barrel body is arranged to be vertical.

In one embodiment, the food processor further comprises: a juice discharge opening arranged on the second barrel body, wherein after the separation between juice and food residues, the food juice is discharged through the juice discharge opening; and a residue discharge opening arranged on the second barrel body, wherein after the separation between juice and food residues, the food residues are discharged through the residue discharge opening.

In one embodiment, after the pulverized food enters the second barrel body, juice is separated from the food residues under the squeezing effect of the squeezing device, the separated food juice is discharged from the juice discharge opening in the second barrel body, and the separated food residues are discharged from the residue discharge opening in the second barrel body.

In one embodiment, a filter sheet is arranged at the juice discharge opening.

In one embodiment, by arranging a filter sheet, the food residues can be prevented from being discharged from the juice discharge opening. Moreover, the distance between the filter sheet and the squeezing device can be reasonably set in accordance with the particle size of the food residues, so that automatic cleaning of the filter sheet can be realized by utilizing the friction between the squeezing device and the filter sheet.

the filter sheet is a metal filter sheet. Since a metal filter sheet has relatively high hardness and wear resistance, at the time of cleaning the filter sheet by utilizing the squeezing device, it is possible to prevent the occurrence of the case where the filter screen is damaged due to insufficient strength.

In one embodiment, a squeezing rubber sheet is arranged at the residue discharge opening.

In one embodiment, by arranging a squeezing rubber sheet at the residue discharge opening, it is possible to further squeeze the food, so as to enable more thorough separation between juice and food residues, so that more food juice can be squeezed out, which can thereby improve the juice yield of the food processor.

In one embodiment, the smashing device is a grinding spiral head or a cutter, and the squeezing device is a squeezing screw rod.

In one embodiment, the smashing of the food and the pushing of the food into the second barrel body can be realized by using a grinding spiral head or a cutter, and the squeezing and residue discharging can be realized by using a squeezing screw rod.

when the smashing device is a grinding spiral head, a groove or a convex rib is arranged on the inner side wall of the first barrel body in the axial direction. By arranging a groove or a convex rib on the inner side wall of the first barrel body, the friction between the food and the side wall of the first barrel body can be increased, so that under the effect of the grinding spiral head, greater friction can be generated between the food and the side wall of the first barrel body, which thereby can smash the food into smaller pieces in the first barrel body, and further enable more thorough separation between juice and food residues after the food enters the second barrel body, thereby improving the juice yield.

when the smashing device is a grinding spiral head, a preset gap a is formed between the inner side wall of the first barrel body and the grinding spiral head, and the value of the preset gap a is 0.8 mm≤a≤4 mm.

In one embodiment, a preset gap a is formed between the inner side wall of the first barrel body and the grinding spiral head, the food entering the first barrel body is located in the preset gap and is pulverized under the combined effect of the first barrel body and the grinding spiral head, the pulverized food is pushed to the communication port along the grinding spiral head under the guide of the grinding spiral head and enters the second barrel body through the communication port.

when the smashing device is a cutter, at least one blocking rib is arranged on the inner side wall of the first barrel body, the blocking rib cooperates with the cutter, so as to cut the food entering the first barrel body from the feed inlet. In one embodiment, the food can be cut into smaller pieces by the cooperation of the blocking rib arranged on the inner side wall of the first barrel body with the cutter. In one embodiment, for example, the blocking rib can block the movement of the food when the cutter cuts the food, so that the cutter can hit the food exactly, so as to cut the food into smaller pieces, and cutting the food into smaller pieces enables the squeezing of more food juice, which thereby can improve the juice yield of the food.

In one embodiment, a first gap b is formed between the cutter and the inner side wall of the first barrel body, a second gap c is formed between the cutter and the blocking rib in the axial direction of the first barrel body, and a third gap d is formed between the cutter and the feed inlet, wherein the value of the first gap b is 2 mm≤b≤12 mm, the value of the second gap c is 3 mm≤c≤15 mm, and the value of the third gap d is 3 mm≤d≤20 mm.

In one embodiment, a first gap b is formed between the inner side wall of the first barrel body and the cutter, the food entering the first barrel body is located in the first gap b and is cut into small pieces by the cutter, and the food that has been cut into small pieces is pushed to the communication port along the cutter under the guide of the cutter and enters the second barrel body through the communication port. Moreover, by the setting of distance, it is possible to ensure, to the largest extent, the cutting effect of the food and the discharge effect that the cut food is discharged from the communication port into the second barrel body. In one embodiment, the material of the cutter can be metal such as stainless steel, etc., or plastic, ceramic, etc. Furthermore, the number of the cutter can be one, two or more, and the cutter can have a single-blade, double-blade or multi-blade structure, etc.

In one embodiment, the size of the first barrel body is gradually reduced from the end close to the feed inlet to the end close to the communication port.

In one embodiment, the first barrel body can be arranged to have a shape that the upper portion thereof is larger than the lower portion thereof. In one embodiment, if the first barrel body is circular, the diameter of the first barrel body is gradually reduced from top to bottom, and if the first barrel body is non-circular, the width and the length of the cross section of the first barrel body are gradually reduced from top to bottom. Such configuration enables the food to be cut into smaller and smaller pieces. In one embodiment, for example, when the food just enters the first barrel body, the particle size of the food is large, the distance between the inner side wall of the first barrel body and the smashing device is adapted to the particle size of the food, and under the effect of the smashing device and the first barrel body, the food is gradually smashed into smaller particles and gradually moves to the communication port, thus, the gap close to the communication port is set to be relatively small, so that on the one hand, the gap can be adapted to the particle size of the food here, and on the other hand, the food here can be further smashed into smaller particles by the smashing device, which thereby can achieve sufficient smashing of the food step by step, and further improve the juice yield of the food.

when the smashing device is a grinding spiral head and the squeezing device is a squeezing screw rod, the rotational speed ratio between the first drive shaft and the second drive shaft is A, wherein the value of the rotational speed ratio A is 0.8≤A≤1.5, In one embodiment, for example, when the rotational speed of the grinding spiral head is 60 RPM, the rotational speed of the squeezing screw rod is set to 48 RPM-90 RPM. When the smashing device is a cutter and the squeezing device is a squeezing screw rod, the rotational speed ratio A between the first drive shaft and the second drive shaft ranges from 1 to 3, In one embodiment, for example, when the rotational speed of the squeezing screw rod is set to 60 RPM, the rotational speed of the cutter is 60 RPM-180 RPM.

In one embodiment, by reasonably setting the rotational speed ratio between the first drive shaft and the second drive shaft, it is possible to adapt the food grinding degree to the squeezing and discharging degree, which thereby can prevent the occurrence of the cases such as insufficient food grinding or insufficient squeezing, so that the food not only can be sufficiently ground but also can be sufficiently squeezed, thereby improving the juice yield of the food.

In one embodiment, the food processor further comprises: a feeding barrel which is arranged on the first barrel body, and on which the feed inlet is arranged.

In one embodiment, one feeding barrel can be arranged for feeding control of the food, and in such a case, the feed inlet is arranged in the feeding barrel.

In another technical solution, it is of course feasible to directly place the food into the first barrel body at once without arranging a feeding barrel, and in such a case, the first barrel body is provided with a barrel cover that can be opened or closed, and the feed inlet is just the opening of the first barrel body.

In one embodiment, the host assembly further comprises a base and a shell, wherein the shell and the base define an accommodation cavity, and the drive assembly is installed on the base and located in the accommodation cavity.

In one embodiment, the host assembly further comprises: a control module for controlling working parameters of the food processor, in one embodiment, e.g., the rotational speed of the smashing device and the squeezing device, etc.

In one embodiment, the host assembly further comprises: a power supply module for supplying power to the parts of the food processor, such as the drive assembly, and comprising at least a power supply plug that can be connected to the mains supply, so that in specific use, the power supply plug can be directly connected to the mains supply so as to supply power to the food processor.

In one embodiment, the food processor includes a juice machine and a juicer.

BRIEF DESCRIPTION OF THE DRAWINGS

Embodiments of the present disclosure will be understood from the description of the embodiments in conjunction with the following accompanying drawings, in which.

The correlation between the reference signs in FIG. 1 to FIG. 4 and the names of the components is as follows:

11: first barrel body, 111: blocking rib, 12: second barrel body, 121: juice discharge opening, 122: residue discharge opening, 13: smashing device, 14: squeezing device, 15: filter sheet, 16: squeezing rubber sheet, 17: feeding barrel, 2: host assembly, 21: drive assembly, 211: motor, 212: first transmission member, 213: first drive shaft, 214: second transmission member, 215: second drive shaft, 216: lower housing, 217: upper housing, 218: deceleration assembly, 22: base, and 23: shell.

DETAILED DESCRIPTION OF THE INVENTION

In order to understand the embodiments of the present disclosure more clearly, the present disclosure is further described in detail with reference to the accompanying drawings and the embodiments. It should be noted that the embodiments of the present disclosure and the features in the embodiments can be combined with each other if there is no conflict.

In the following description, numerous details are set forth to facilitate full understanding of the present disclosure. However, the present disclosure may also be implemented in other ways than those described herein. Thus, the protection scope of the present disclosure is not limited by the embodiments disclosed below.

A drive assembly 21 and a food processor provided in accordance with some embodiments of the present disclosure are described below with reference to FIGS. 1-4.

Figure 1:
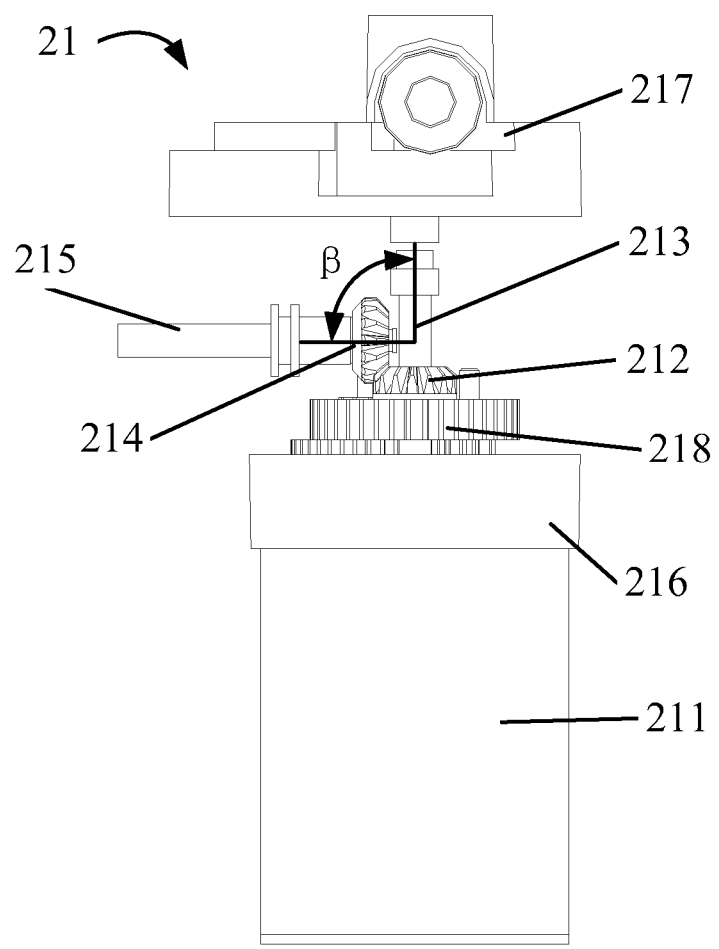
FIG. 1 is a schematic structural diagram of a drive assembly according to one embodiment of the present disclosure.

As shown in FIG. 1, an embodiment of the present disclosure provides a drive assembly 21, comprising: a drive body; and a transmission assembly comprising at least a first transmission member 212 and a second transmission member 214, the first transmission member 212 being in driving connection with the drive body and provided thereon with a first drive shaft 213, and the second transmission member 214 being in driving connection with the drive body and provided thereon with a second drive shaft 215.

The drive assembly 21 according to the embodiment of the present disclosure is capable of driving, using a single drive body, at least two drive shafts to move, so that multi-shaft output with a single drive body can be realized. Therefore, when the drive assembly 21 is used for a food processor, the first drive shaft 213 can be used to drive a smashing device 13 to smash food, and then the second drive shaft 215 can be used to drive a squeezing device 14 to squeeze the food, so as to separate the juice from the residues of the food, so that the smashing process of the food can be separated from the squeezing and residue discharging process, and at the same time, since squeezing and residue discharging are not required during the smashing process of the food, there is no need to arrange the structures such as a filter screen, and therefore the use of a filter screen and the like can be avoided, which thereby can reduce the number of parts of the food processor, so as to simplify the structure of the food processor and reduce the manufacturing and processing costs of the food processor.

In the above technical solution, the drive assembly further comprises: a power supply module that is connected with the drive body and is used for supplying power to the drive body.

In one embodiment, a power supply module can be provided, so that the power supply module can be connected with the mains supply, so as to supply power to the drive assembly using the mains supply.

In the above technical solution, as shown in FIG. 1, the drive body is a motor 211 comprising a motor shaft, the first transmission member 212 is in driving connection with the motor shaft, and the second transmission member 214 is in driving connection with the first transmission member 212.

In one embodiment, the drive body is a motor 211, thus, it is possible to use the motor 211 to drive the transmission assembly to move, and such driving mode of motor 211 is simple in structure and easy to realize.

In one embodiment, as shown in FIG. 1, the first drive shaft 213 and the second drive shaft 215 are arranged to form a preset angle β, wherein the value of the preset angle β is more than or equal to 60° and less than or equal to 135°.

In one embodiment, the drive assembly 21 can achieve multi-shaft and multi-angle output by means of the first drive shaft 213 and the second drive shaft 215, so that the single output direction of the drive assembly 21 can be changed into multiple output directions, and therefore the driving of drive devices in multiple directions can be achieved at the same time using the drive assembly 21. In one embodiment, multi-shaft and multi-angle output of the drive assembly 21 can be achieved by reasonably selecting the structure of the first transmission member 212 and the second transmission member 214, or reasonably arranging the position of the first transmission member 212 and the second transmission member 214. Further, the preset angle β is greater than or equal to 75° and smaller than or equal to 120°, and In one embodiment, as shown in FIG. 1, the preset angle β is equal to 90°, i.e., the first drive shaft 213 and the second drive shaft 215 are arranged to be perpendicular to each other.

In one embodiment, the rotational speed ratio between the first drive shaft 213 and the second drive shaft 215 is A, wherein the value of the rotational speed ratio A is more than or equal to ⅔ and less than or equal to 3.

In one embodiment, the rotational speed ratio between the first drive shaft 213 and the second drive shaft 215 can be reasonably controlled by reasonably selecting the parameters of the first transmission member 212 and the second transmission member 214, so that the rotational speed ratio between the first drive shaft 213 and the second drive shaft 215 can be adapted to specific application occasions.

In one embodiment, the rotational speed ratio is 1.

In one embodiment, the first drive shaft 213 and the second drive shaft 215 rotate in the same direction or in opposite directions.

In one embodiment, the first drive shaft 213 and the second drive shaft 215 can rotate in the same direction, for example, both rotate clockwise or both rotate anticlockwise; and of course, the first drive shaft 213 and the second drive shaft 215 can also rotate oppositely, in one embodiment, for example, one rotates clockwise and the other rotates anti-clockwise.

In one embodiment, the first transmission member 212 and the second transmission member 214 are bevel gears that are meshed with each other; or the first transmission member 212 is a turbine, and the second transmission member 214 is a worm; or the first transmission member 212 and the second transmission member 214 are two helical gears whose shafts are arranged in a staggered manner.

In one embodiment, when the output direction of the motor 211 is changed into multi-shaft and multi-angle output by means of the transmission assembly, a plurality of transmission modes can be used for the first transmission member 212 and the second transmission member 214, in one embodiment, for example, the transmission mode of bevel gear and bevel gear, the transmission mode of turbine and worm, or the transmission mode of helical gears with staggered shafts, etc.

In one embodiment, as shown in FIG. 1, the transmission assembly further comprises: a housing comprising an upper housing 217 and a lower housing 216 that are assembled, the upper housing 217 and the lower housing 216 defining an installation cavity, the first transmission member 212 and the second transmission member 214 being positioned in the installation cavity, and the first drive shaft 213 and the second drive shaft 215 extending out of the housing.

In one embodiment, the first transmission member 212 and the second transmission member 214, and the first drive shaft 213 and the second drive shaft 215 can be installed in the housing, so that when in specific use, the transmission assembly can be moved and replaced as a whole.

In one embodiment, as shown in FIG. 1, the transmission assembly further comprises a deceleration assembly 218 arranged between the first transmission member 212 and the motor shaft for reducing the rotational speed of the motor shaft to a desired rotational speed of the first drive shaft 213 and the second drive shaft 215.

In another technical solution (not shown in the figures), the drive body is an electrified coil, the first transmission member 212 and the second transmission member 214 are both magnetically conducting disc bodies that rotate under a magnetic field generated by the electrified coil.

In one embodiment, the multi-shaft and multi-angle output can be realized by using the principle of solenoid drive. In one embodiment, for example, a magnetic field can be generated by using the electrified coil, and then the magnetically conducting disc bodies are driven to rotate by using the interaction between the magnetic property of the magnetically conducting disc bodies and the magnetic field of the electrified coil, so that the rotation of the magnetically conducting disc bodies can drive the first drive shaft 213 and the second drive shaft 215 to rotate, thereby achieving the multi-shaft and multi-angle output of the drive assembly 21.

In one embodiment, the magnetically conducting disc body comprises a disc body and a plurality of magnetically conducting bodies distributed in the circumferential direction of the disc body, wherein the magnetically conducting body is preferably a magnet.

Figure 2:
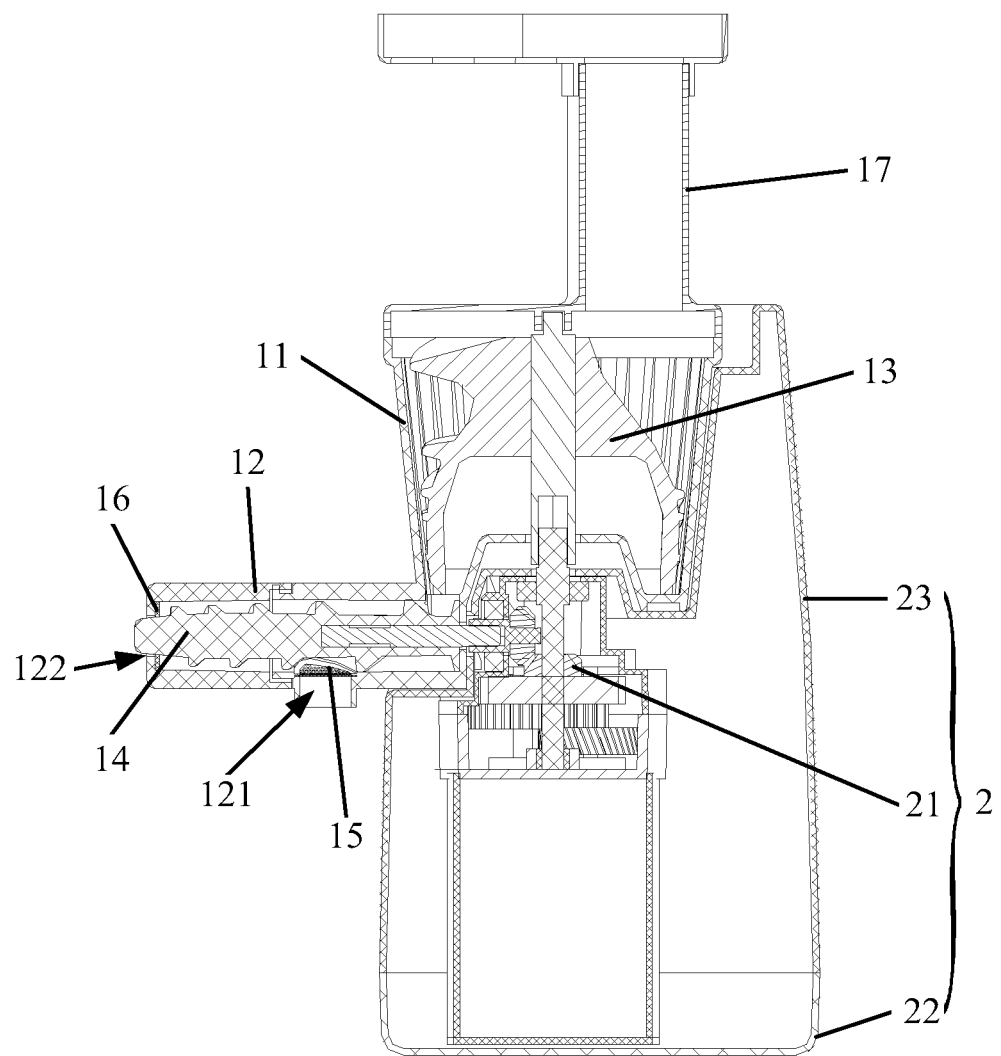
FIG. 2 is a schematic structural diagram of a food processor according to one embodiment of the present disclosure.
Figure 3:
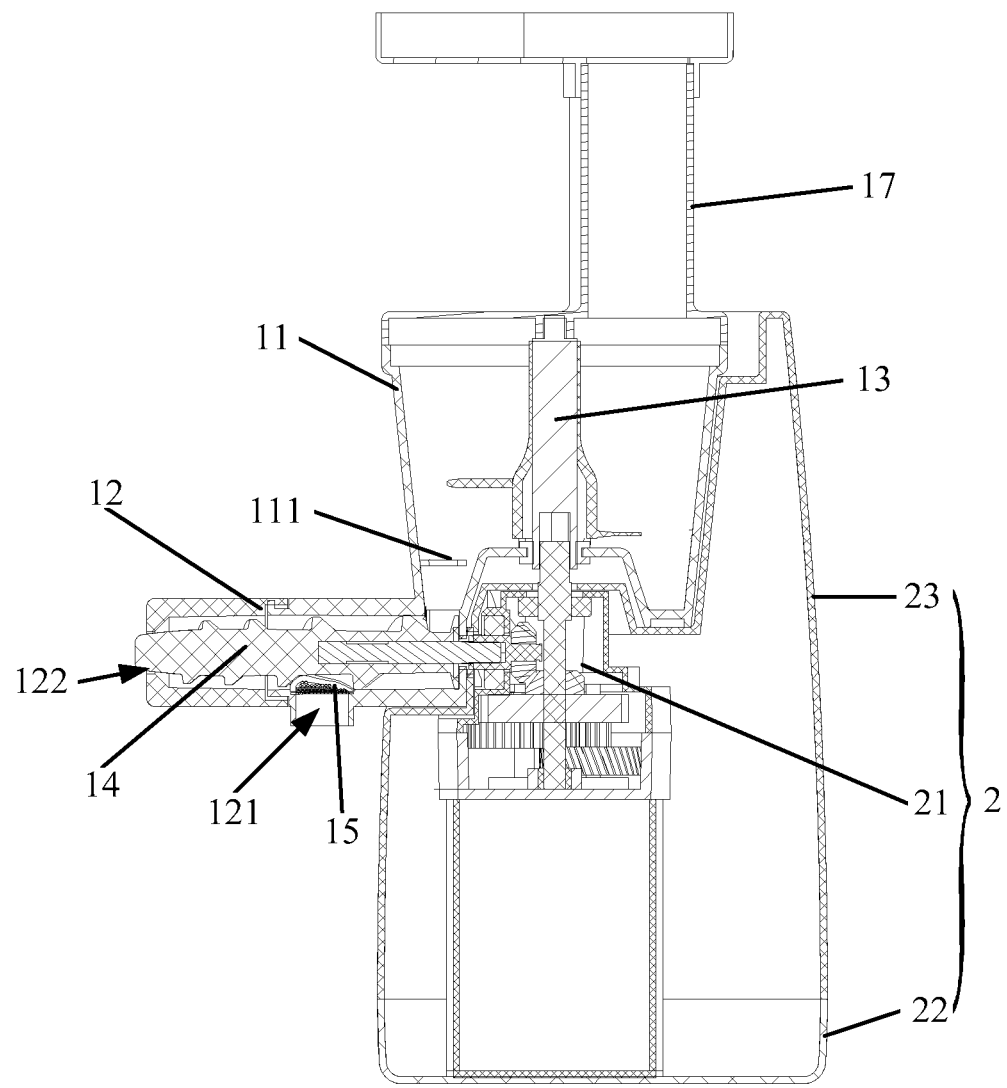
FIG. 3 is a schematic structural diagram of the food processor according to another embodiment of the present disclosure.
Figure 4:
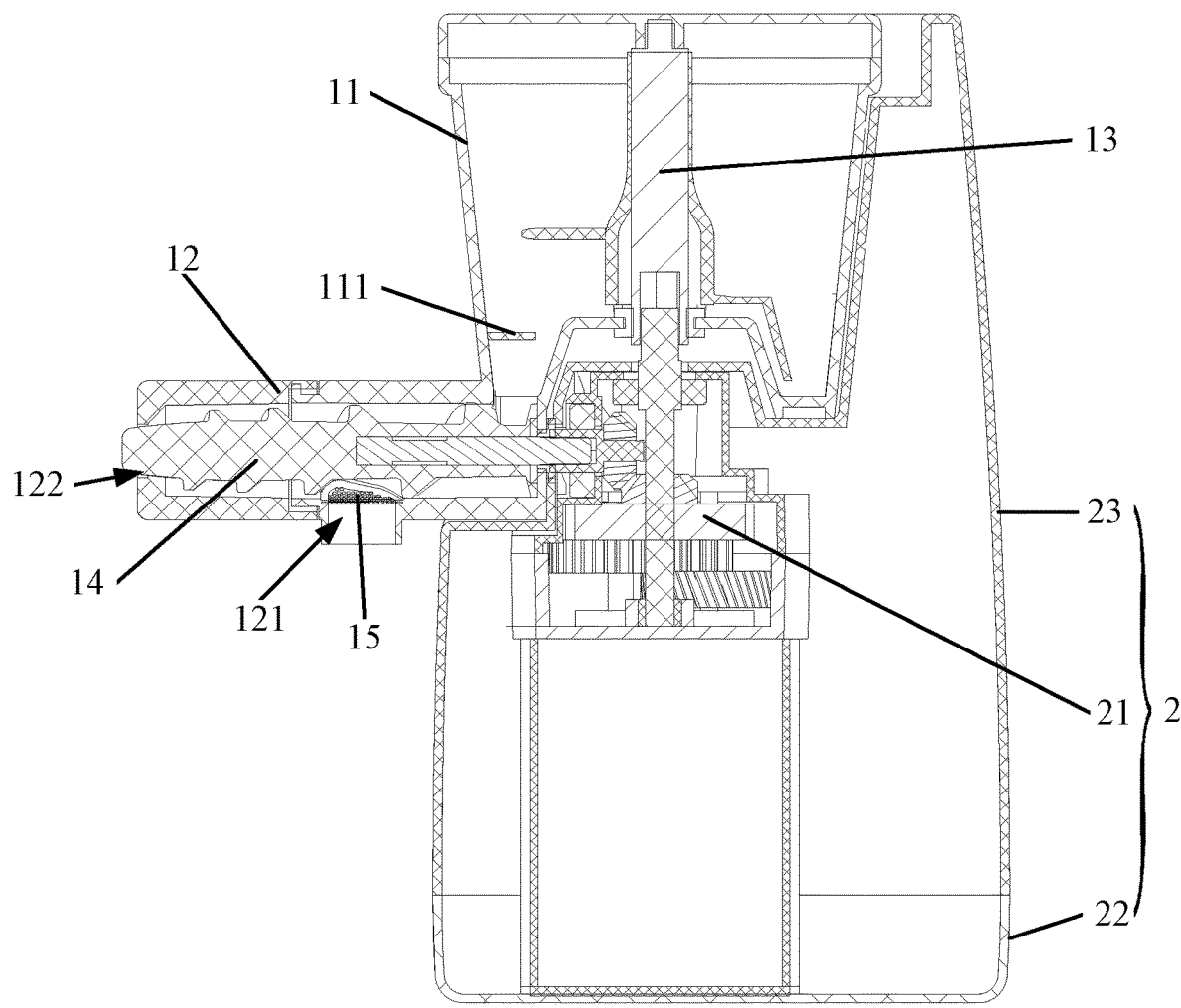
FIG. 4 is a schematic structural diagram of the food processor according to a further embodiment of the present disclosure.

As shown in FIGS. 2-4, an embodiment of the present disclosure provides a food processor comprising a drive assembly 21 in any of the above technical solutions.

The food processor according to the embodiment of the present disclosure comprises a drive assembly 21 provided in any of the embodiments of the present disclosure, and therefore the food processor has all the beneficial effects of the drive assembly 21 provided in any of the above embodiments.

In one embodiment, as shown in FIGS. 2-4, the food processor further comprises: a host assembly 2 comprising a drive assembly 21; a barrel body assembly installed on the host assembly 2 and comprising a feed inlet; a first barrel body 11 communicating with the feed inlet; and a second barrel body 12 communicating with the first barrel body 11 through a communication port; a smashing device 13 that is arranged in the first barrel body 11, is in driving connection with the first drive shaft 213 and is rotated under the driving of the first drive shaft 213; and a squeezing device 14 that is arranged in the second barrel body 12, is in driving connection with the second drive shaft 215 and is rotated under the driving of the second drive shaft 215, wherein when rotating, the smashing device 13 is capable of cooperating with an inner side wall of the first barrel body 11 to smash food entering the first barrel body 11 from the feed inlet, and the smashed food enters, under the effect of the smashing device 13, the second barrel body 12 through the communication port and is squeezed by the squeezing device 14 in the second barrel body 12 to achieve separation between juice and food residues.

In one embodiment, food enters the first barrel body 11 from the feed inlet and is then smashed by the smashing device 13 matched with the side wall of the first barrel body 11, and the smashed food enters, under the effect of the smashing device 13, the second barrel body 12 from the communication port, and is then squeezed by the squeezing device 14 to achieve separation between juice and food residues. In one embodiment, the smashing process of the food is separated from the squeezing and residue discharging process, in the smashing process, since squeezing and residue discharging are not required, there is no need to arrange the components such as a filter screen and a rotary brush in the first barrel body 11, so that the food in the first barrel body 11 can be smashed under the combined effect of the first barrel body 11 and the smashing device 13, and in the squeezing and residue discharging process, the squeezing device 14 can be substantially horizontally arranged, i.e., the squeezing and residue discharging system can be arranged to be horizontal, which thereby makes it very convenient to separate juice from food residues. Such configuration can, on the one hand, ensure the juice yield of the food processor, and on the other hand, avoid the use of the parts such as a filter screen and a rotary brush, which thereby makes the food processor simple in structure and easy to install; furthermore, since the filter screen is omitted, it is possible to reduce the cleaning difficulty for the user, which thereby improves the user experience. In one embodiment, it is feasible to drive the smashing device 13 by means of the first drive shaft 213 of the drive assembly 21 to smash the food, and drive the squeezing device 14 by means of the second drive shaft 215 of the drive assembly 21 to squeeze the food so as to achieve separation between juice and food residues.

In one embodiment, as shown in FIGS. 2-4, the feed inlet is located at an upper end of the first barrel body 11, the communication port is located at a lower end of the first barrel body 11, the second barrel body 12 is installed on a side wall of the first barrel body 11, and the first barrel body 11 is arranged to be vertical.

In one embodiment, as shown in FIGS. 2-4, the food processor further comprises: a juice discharge opening 121 arranged on the second barrel body 12, wherein after the separation between juice and food residues, the food juice is discharged through the juice discharge opening 121; and a residue discharge opening 122 arranged on the second barrel body 12, wherein after the separation between juice and food residues, the food residues are discharged through the residue discharge opening 122.

In one embodiment, after the pulverized food enters the second barrel body 12, juice is separated from the food residues under the squeezing effect of the squeezing device 14, the separated food juice is discharged from the juice discharge opening 121 in the second barrel body 12, and the separated food residues are discharged from the residue discharge opening 122 in the second barrel body 12.

In one embodiment, as shown in FIGS. 2-4, a filter sheet 15 is arranged at the juice discharge opening 121.

In one embodiment, by arranging a filter sheet 15, the food residues can be prevented from being discharged from the juice discharge opening 121. Moreover, the distance between the filter sheet 15 and the squeezing device 14 can be reasonably set in accordance with the particle size of the food residues, so that automatic cleaning of the filter sheet 15 can be realized by utilizing the friction between the squeezing device 14 and the filter sheet 15.

In one embodiment, the filter sheet 15 is a metal filter sheet. Since a metal filter sheet has relatively high hardness and wear resistance, at the time of cleaning the filter sheet 15 by utilizing the squeezing device 14, it is possible to prevent the occurrence of the case where the filter screen is damaged due to insufficient strength.

In one embodiment, as shown in FIGS. 2-4, a squeezing rubber sheet 16 is arranged at the residue discharge opening 122.

In one embodiment, by arranging a squeezing rubber sheet 16 at the residue discharge opening 122, it is possible to further squeeze the food, so as to enable more thorough separation between juice and food residues, so that more food juice can be squeezed out, which can thereby improve the juice yield of the food processor.

In one embodiment, as shown in FIG. 2, the smashing device 13 is a grinding spiral head, or as shown in FIGS. 3 and 4, the smashing device 13 is a cutter, and as shown in FIGS. 2-4, the squeezing device 14 is a squeezing screw rod.

In one embodiment, the smashing of the food and the pushing of the food into the second barrel body 12 can be realized by using a grinding spiral head or a cutter, and the squeezing and residue discharging can be realized by using a squeezing screw rod.

In one embodiment, as shown in FIG. 2, when the smashing device 13 is a grinding spiral head, a groove or a convex rib is arranged on the inner side wall of the first barrel body 11 in the axial direction. By arranging a groove or a convex rib on the inner side wall of the first barrel body 11, the friction between the food and the side wall of the first barrel body 11 can be increased, so that under the effect of the grinding spiral head, greater friction can be generated between the food and the side wall of the first barrel body 11, which thereby can smash the food into smaller pieces in the first barrel body 11, and further enable more thorough separation between juice and food residues after the food enters the second barrel body 12, thereby improving the juice yield.

In one embodiment, as shown in FIG. 2, when the smashing device 13 is a grinding spiral head, a preset gap a is formed between the inner side wall of the first barrel body 11 and the grinding spiral head, and the value of the preset gap a is 0.8 mm≤a≤4 mm.

In one embodiment, a preset gap a is formed between the inner side wall of the first barrel body 11 and the grinding spiral head, the food entering the first barrel body 11 is located in the preset gap and is pulverized under the combined effect of the first barrel body 11 and the grinding spiral head, the pulverized food is pushed to the communication port along the grinding spiral head under the guide of the grinding spiral head and enters the second barrel body 12 through the communication port.

In one embodiment, as shown in FIGS. 3 and 4, when the smashing device 13 is a cutter, at least one blocking rib 111 is arranged on the inner side wall of the first barrel body 11, the blocking rib 111 cooperates with the cutter, so as to cut the food entering the first barrel body 11 from the feed inlet. In one embodiment, the food can be cut into smaller pieces by the cooperation of the blocking rib 111 arranged on the inner side wall of the first barrel body 11 with the cutter. In one embodiment, for example, the blocking rib 111 can block the movement of the food when the cutter cuts the food, so that the cutter can hit the food exactly, so as to cut the food into smaller pieces, and cutting the food into smaller pieces enables the squeezing of more food juice, which thereby can improve the juice yield of the food.

In one embodiment, as shown in FIGS. 3 and 4, a first gap b is formed between the cutter and the inner side wall of the first barrel body 11, a second gap c is formed between the cutter and the blocking rib 111 in the axial direction of the first barrel body 11, and a third gap d is formed between the cutter and the feed inlet, wherein the value of the first gap b is 2 mm≤b≤12 mm, the value of the second gap c is 3 mm≤c≤15 mm, and the value of the third gap d is 3 mm≤d≤20 mm.

In one embodiment, a first gap b is formed between the inner side wall of the first barrel body 11 and the cutter, the food entering the first barrel body 11 is located in the first gap b and is cut into small pieces by the cutter, and the food that has been cut into small pieces is pushed to the communication port along the cutter under the guide of the cutter and enters the second barrel body 12 through the communication port. Moreover, by the setting of distance, it is possible to ensure, to the largest extent, the cutting effect of the food and the discharge effect that the cut food is discharged from the communication port into the second barrel body 12. In one embodiment, the material of the cutter can be metal such as stainless steel, etc., or plastic, ceramic, etc. Furthermore, the number of the cutter can be one, two or more, and the cutter can have a single-blade, double-blade or multi-blade structure, etc.

In one embodiment, as shown in FIGS. 2-4, the size of the first barrel body 11 is gradually reduced from the end close to the feed inlet to the end close to the communication port.

In one embodiment, the first barrel body 11 can be arranged to have a shape that the upper portion thereof is larger than the lower portion thereof. In one embodiment, if the first barrel body 11 is circular, the diameter of the first barrel body 11 is gradually reduced from top to bottom, and if the first barrel body 11 is non-circular, the width and the length of the cross section of the first barrel body 11 are gradually reduced from top to bottom. Such configuration enables the food to be cut into smaller and smaller pieces. In one embodiment, for example, when the food just enters the first barrel body 11, the particle size of the food is large, the distance between the inner side wall of the first barrel body 11 and the smashing device 13 is adapted to the particle size of the food, and under the effect of the smashing device 13 and the first barrel body 11, the food is gradually smashed into smaller particles and gradually moves to the communication port, thus, the gap close to the communication port is set to be relatively small, so that on the one hand, the gap can be adapted to the particle size of the food here, and on the other hand, the food here can be further smashed into smaller particles by the smashing device 13, which thereby can achieve sufficient smashing of the food step by step, and further improve the juice yield of the food.

In one embodiment, when the smashing device 13 is a grinding spiral head and the squeezing device 14 is a squeezing screw rod, the rotational speed ratio between the first drive shaft 213 and the second drive shaft 215 is A, wherein the value of the rotational speed ratio A is 0.8≤A≤1.5, in one embodiment, for example, when the rotational speed of the grinding spiral head is 60 RPM, the rotational speed of the squeezing screw rod is set to 48 RPM-90 RPM. When the smashing device 13 is a cutter and the squeezing device is a squeezing screw rod, the rotational speed ratio A between the first drive shaft 213 and the second drive shaft 215 ranges from 1 to 3, in one embodiment, for example, when the rotational speed of the squeezing screw rod is set to 60 RPM, the rotational speed of the cutter is 60 RPM-180 RPM.

In one embodiment, by reasonably setting the rotational speed ratio between the first drive shaft 213 and the second drive shaft 215, it is possible to adapt the food grinding degree to the squeezing and discharging degree, which thereby can prevent the occurrence of the cases such as insufficient food grinding or insufficient squeezing, so that the food not only can be sufficiently ground but also can be sufficiently squeezed, thereby improving the juice yield of the food.

In one embodiment, as shown in FIGS. 2 and 3, the food processor further comprises: a feeding barrel 17 which is arranged on the first barrel body 11, and on which the feed inlet is arranged.

In one embodiment, one feeding barrel 17 can be arranged for feeding control of the food, and in such a case, the feed inlet is arranged in the feeding barrel 17.

In another technical solution, it is of course feasible to directly place the food into the first barrel body 11 at once without arranging a feeding barrel 17, as shown in FIG. 4, and in such a case, the first barrel body 11 is provided with a barrel cover that can be opened or closed, and the feed inlet is just the opening of the first barrel body 11.

In one embodiment, as shown in FIGS. 2-4, the host assembly 2 further comprises a base 22 and a shell 23, wherein the shell 23 and the base 22 define an accommodation cavity, and the drive assembly 21 is installed on the base 22 and located in the accommodation cavity. In one embodiment, the host assembly 2 further comprises: a control module for controlling working parameters of the food processor, In one embodiment, e.g., the rotational speed of the smashing device 13 and the squeezing device 14, etc.

In one embodiment, the host assembly 2 further comprises: a power supply module for supplying power to the parts of the food processor, such as the drive assembly 21, and comprising at least a power supply plug that can be connected to the mains supply, so that in specific use, the power supply plug can be directly connected to the mains supply so as to supply power to the food processor.

In one embodiment, the food processor includes a juice machine and a juicer. In the description of the present description, the terms "first" and "second" are only used for illustrative purpose, and cannot be understood as indication or suggestion of relative importance, unless otherwise explicitly specified and defined; the terms such as "connect", "install" and "fix" shall be understood in broad sense, for example, "connect" may refer to fixed connection, detachable connection or integral connection; and may refer to direct connection, or indirect connection by means of an intermediate medium.

In the description of the present description, the description of the terms such as "one embodiment", "some embodiments" and "embodiments" is intended to mean that the specific features, structures, materials or characteristics described in conjunction with the embodiment or example are included in at least one embodiment or example of the present disclosure. In the present description, the schematic representation of the terms does not necessarily refer to the same embodiment or example. Moreover, the specific features, structures, materials or characteristics described may be combined in any suitable manner in any one or more embodiments or examples.

What is claimed is:
1. A food processor, comprising:
  a drive assembly which comprises a drive body and a transmission assembly comprising at least a first transmission member and a second transmission member, the first transmission member being in driving connection with the drive body and provided thereon with a first drive shaft, and the second transmission member being in driving connection with the drive body and provided thereon with a second drive shaft;
  a host assembly comprising the drive assembly;

a barrel body assembly installed on the host assembly and comprising:
a feed inlet;
a first barrel body communicating with the feed inlet;
a second barrel body communicating with the first barrel body through a communication port;
a smashing device that is arranged in the first barrel body, is in driving connection with the first drive shaft of the drive assembly and is rotated under the driving of the first drive shaft; and
a squeezing device that is arranged in the second barrel body, is in driving connection with the second drive shaft of the drive assembly and is rotated under the driving of the second drive shaft,
wherein when rotating, the smashing device is capable of cooperating with an inner side wall of the first barrel body to smash food entering the first barrel body from the feed inlet, and the smashed food enters, under the effect of the smashing device, the second barrel body through the communication port and is squeezed by the squeezing device in the second barrel body to achieve separation between juice and food residues.

2. The food processor according to claim 1, further comprising:
a juice discharge opening arranged on the second barrel body, wherein after the separation between juice and food residues, the food juice is discharged through the juice discharge opening; and
a residue discharge opening arranged on the second barrel body, wherein after the separation between juice and food residues, the food residues are discharged through the residue discharge opening.

3. The food processor according to claim 1, wherein the smashing device is a grinding spiral head or a cutter, and the squeezing device is a squeezing screw rod.

4. The food processor according to claim 1, wherein the drive body is a motor comprising a motor shaft, the first transmission member is in driving connection with the motor shaft, and the second transmission member is in driving connection with the first transmission member.

5. The food processor according to claim 1, wherein the first drive shaft and the second drive shaft are arranged to form a preset angle $\beta$, and
wherein the value of the preset angle $\beta$ is more than or equal to 60° and less than or equal to 135°.

6. The food processor according to claim 1, wherein the rotational speed ratio between the first drive shaft and the second drive shaft is A, the value of which is more than or equal to $\frac{2}{3}$ and less than or equal to 3.

7. The food processor according to claim 1, wherein the first drive shaft and the second drive shaft rotate in the same direction or in opposite directions.

8. The food processor according to claim 1, wherein
the first transmission member and the second transmission member are bevel gears that are meshed with each other; or
the first transmission member is a turbine, and the second transmission member is a worm; or
the first transmission member and the second transmission member are two helical gears whose shafts are arranged in a staggered manner.

9. The food processor according to claim 1, wherein the transmission assembly further comprises:
a housing comprising an upper housing and a lower housing that are assembled, the upper housing and the lower housing defining an installation cavity, the first transmission member and the second transmission member being positioned in the installation cavity, and the first drive shaft and the second drive shaft extending out of the housing.

10. The food processor according to claim 1, wherein the transmission assembly further comprises:
a deceleration assembly arranged between the first transmission member and the motor shaft.

11. The food processor according to claim 1, wherein the drive body is an electrified coil, the first transmission member and the second transmission member are both magnetically conducting disc bodies that rotate under a magnetic field generated by the electrified coil.

* * * * *